US008073686B2

(12) United States Patent
Kida et al.

(10) Patent No.: US 8,073,686 B2
(45) Date of Patent: Dec. 6, 2011

(54) APPARATUS, METHOD AND COMPUTER PROGRAM PRODUCT FOR FEATURE EXTRACTION

(75) Inventors: Yusuke Kida, Kanagawa (JP); Takashi Masuko, Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 479 days.

(21) Appl. No.: 12/366,037

(22) Filed: Feb. 5, 2009

(65) Prior Publication Data

US 2009/0222259 A1    Sep. 3, 2009

(30) Foreign Application Priority Data

Feb. 29, 2008 (JP) ................................ 2008-050313

(51) Int. Cl.
*G10L 11/04* (2006.01)
*G10L 19/00* (2006.01)

(52) U.S. Cl. ......... 704/207; 704/205; 704/216; 704/218
(58) Field of Classification Search ........................ None
See application file for complete search history.

(56) References Cited

U.S. PATENT DOCUMENTS

| 5,712,956 | A * | 1/1998 | Yamada et al. | 704/234 |
| 6,226,606 | B1 * | 5/2001 | Acero et al. | 704/218 |
| 7,979,270 | B2 * | 7/2011 | Yamada | 704/205 |
| 2009/0030690 | A1 * | 1/2009 | Yamada | 704/246 |
| 2009/0048835 | A1 | 2/2009 | Masuko | |

FOREIGN PATENT DOCUMENTS

| JP | 04-288600 | 10/1992 |
| JP | 2940835 | 10/1992 |
| JP | 08-044395 | 2/1996 |
| JP | 2003-044077 | 2/2003 |
| JP | 2004-354589 | 12/2004 |
| JP | 2007-328288 | 12/2007 |
| JP | 2008-015214 | 1/2008 |
| JP | 2008-139568 | 6/2008 |
| WO | 87/02816 | 5/1987 |
| WO | 2004/111996 | 12/2004 |

OTHER PUBLICATIONS

Medan, Y.; Yair, E.; Chazan, D.; "Super resolution pitch determination of speech signals," Signal Processing, IEEE Transactions on, Issue Date: Jan. 1991, Volume: 39 Issue:1, On pp. 40-48.*

(Continued)

*Primary Examiner* — Matthew Sked
(74) *Attorney, Agent, or Firm* — Turocy & Watson, LLP

(57) ABSTRACT

A feature extraction apparatus includes a spectrum calculating unit that calculates, based on an input speech signal, a frequency spectrum having frequency components obtained at regular intervals on a logarithmic frequency scale for each of frames that are defined by regular time intervals, and thereby generates a time series of the frequency spectrum; a cross-correlation coefficients calculating unit that calculates, for each target frame of the frames, a cross-correlation coefficients between frequency spectra calculated for two different frames that are in vicinity of the target frame and a predetermined frame width apart from each other; and a shift amount predicting unit that predicts a shift amount of the frequency spectra on the logarithmic frequency scale with respect to the predetermined frame width by use of the cross-correlation coefficients.

11 Claims, 8 Drawing Sheets

OTHER PUBLICATIONS

Nazrul, N.I.; Setu, M.T.H.; Hussain, S.; Hasan, K.; An effective speech preprocessing technique for normalized cross-correlation pitch extractor, Signal Processing and Information Technology, 2003. ISSPIT 2003. Proceedings of the 3rd IEEE International Symposium on, Issue Date: Dec. 14-17, 2003, On pp. 749-752.*

Furui, Dijitaru Onsei Shori, Digital Speech Processing, Tokai University Press, pp. 57-59, 1985.
Wang, et al, A Study of Tones and Tempo in Continuous Mandarin Digit Strings and Their Application in Telephone Quality Speech Recognition, Proceedings if ICSLP, 1998.
Japanese Office Action for 2008-050313 mailed on Dec. 22, 2009.

* cited by examiner

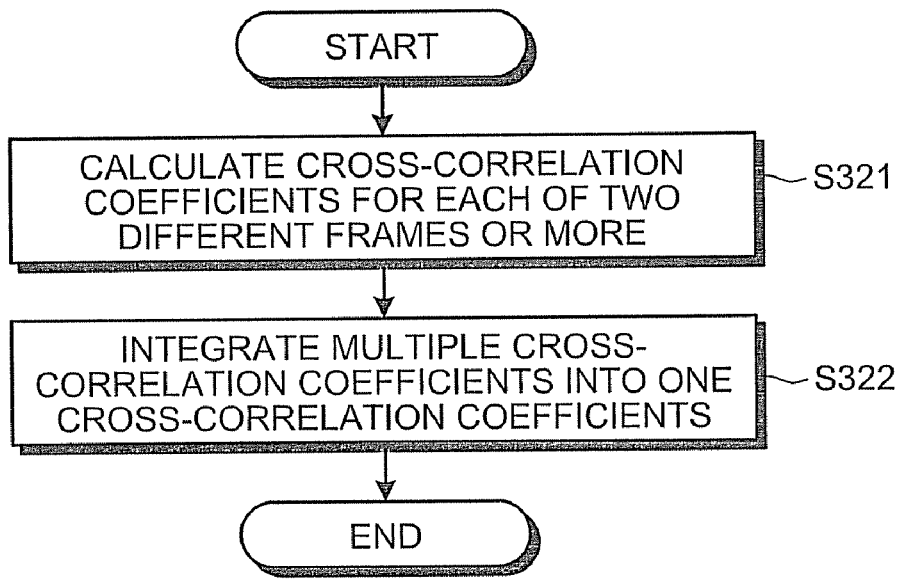
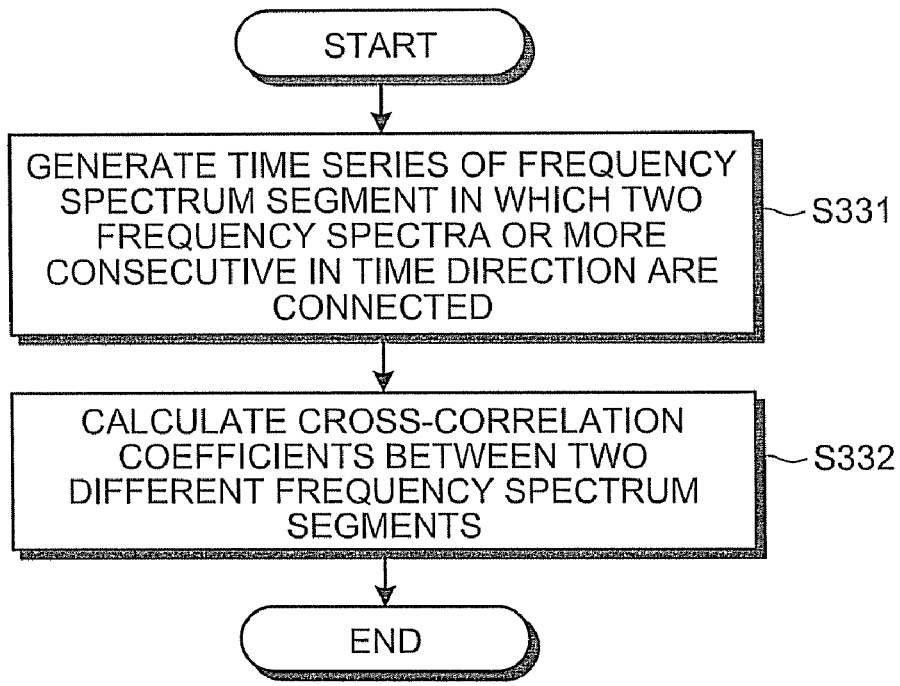

APPARATUS, METHOD AND COMPUTER PROGRAM PRODUCT FOR FEATURE EXTRACTION

CROSS-REFERENCE TO RELATED APPLICATIONS

This application is based upon and claims the benefit of priority from Japanese Patent Application No. 2008-50313, filed on Feb. 29, 2008; the entire contents of which are incorporated herein by reference.

BACKGROUND OF THE INVENTION

1. Field of the Invention

The present invention relates to an apparatus, method and computer program product for feature extraction that calculate a difference between pitch frequencies from an input speech signal.

2. Description of the Related Art

A differential pitch frequency per unit time is one element of speech prosody information. From the differential pitch frequency information, one can obtain information on accents, intonation, and if the speech is voiced or unvoiced sounds. The differential pitch frequency information is therefore adopted in speech recognition devices, voice activity detectors, pitch frequency estimation devices, speaker recognition devices, and the like. A method of obtaining the differential pitch frequency information is described, for example, in Sadaoki Furui, "Dijitaru Onsei Shori (Digital Speech Processing)", Tokai University Press, pp. 57-59 (1985). According to the method in this document, pitch frequencies are first estimated, and then the amount of change in pitch frequencies with time is calculated to obtain the differential pitch frequency information.

With the method according to the above document, however, erroneous pitch frequencies could be estimated, and thus the differential pitch frequency information obtained from these pitch frequencies could be erroneous. Recently, methods of obtaining the differential pitch frequency information less influenced by errors in the pitch frequency estimation have been suggested. One of such methods is described in JP-A 2940835 (KOKAI). According to this document, a cross-correlation function between autocorrelation functions for predictive residuals of a speech at times (frames) t and s is calculated. Then, a peak of this cross-correlation function is extracted so that differential pitch frequency information, in which influence of errors in the pitch frequency estimation is reduced while multiple pitch frequency choices are taken into consideration, can be obtained.

With the method according to JP-A 2940835 (KOKAI), however, the pitch frequency estimation is based on the predictive residuals of the speech. This means that, when extracting the peak value of the cross-correlation function, a peak value that is not the one that corresponds to the differential pitch frequency may be estimated under the influence of the background noise, which makes it difficult to obtain accurate differential pitch frequency information. Furthermore, in the autocorrelation function of the predictive residuals, multiple peaks appear at integral multiples of the pitch period. If peaks at integral multiples are incorporated, the amount of differentials is also multiplied by this integer. For this reason, to obtain accurate differential pitch frequency information, the range of the autocorrelation function of the predictive residuals that is used to obtain the cross-correlation function needs to be narrowed down to the vicinity of the accurate pitch frequency. Then, the pitch frequency has to be calculated in advance, and the range of the pitch frequency has to be suitably determined in accordance with the voice pitch of the speaker. It is technically difficult, however, to suitably determine the range of the pitch frequency. For this reason, a technology of obtaining differential pitch frequency information in which the influence of the background noise is reduced, without narrowing down the range of the pitch frequency, has been sought.

SUMMARY OF THE INVENTION

According to one aspect of the present invention, a feature extraction apparatus includes a spectrum calculating unit configured to calculate, based on an input speech signal, a frequency spectrum having frequency components obtained at regular intervals on a logarithmic frequency scale for each of frames that are defined by regular time intervals, and thereby generates a time series of the frequency spectrum; a cross-correlation coefficients calculating unit configured to calculate, for each target frame of the frames, a cross-correlation coefficients between frequency spectra calculated for two different frames that are in vicinity of the target frame and a predetermined frame width apart from each other; and a shift amount predicting unit configured to predict a shift amount of the frequency spectra on the logarithmic frequency scale with respect to the predetermined frame width by use of the cross-correlation coefficients.

According to another aspect of the present invention, a feature extraction method executed in an feature extraction apparatus including a spectrum calculating unit, a cross-correlation coefficients calculating unit and a shift amount predicting unit, the method includes calculating, based on an input speech signal by the a spectrum calculating unit, a frequency spectrum having frequency components obtained at regular intervals on a logarithmic frequency scale for each of frames that are defined by regular time intervals, and thereby generating a time series of the frequency spectrum; calculating, for each target frame of the frames by the a cross-correlation coefficients calculating unit, a cross-correlation coefficients between frequency spectra calculated for two different frames that are in vicinity of the target frame and a predetermined frame width apart from each other; and predicting a shift amount of the frequency spectra on the logarithmic frequency scale by the shift amount predicting unit with respect to the predetermined frame width by use of the cross-correlation coefficients.

A computer program product according to still another aspect of the present invention causes a computer to perform the method according to the present invention.

BRIEF DESCRIPTION OF THE DRAWINGS

FIG. 10 is a flowchart showing the detailed procedure of an operation in which the cross-correlation coefficients calculating unit 102 calculates the cross-correlation coefficients according to a second embodiment;

FIG. 11 is a flowchart showing the detailed procedure of an operation in which the cross-correlation coefficients calculating unit 102 calculates the cross-correlation coefficients according to a third embodiment;

DETAILED DESCRIPTION OF THE INVENTION

Figure 1:
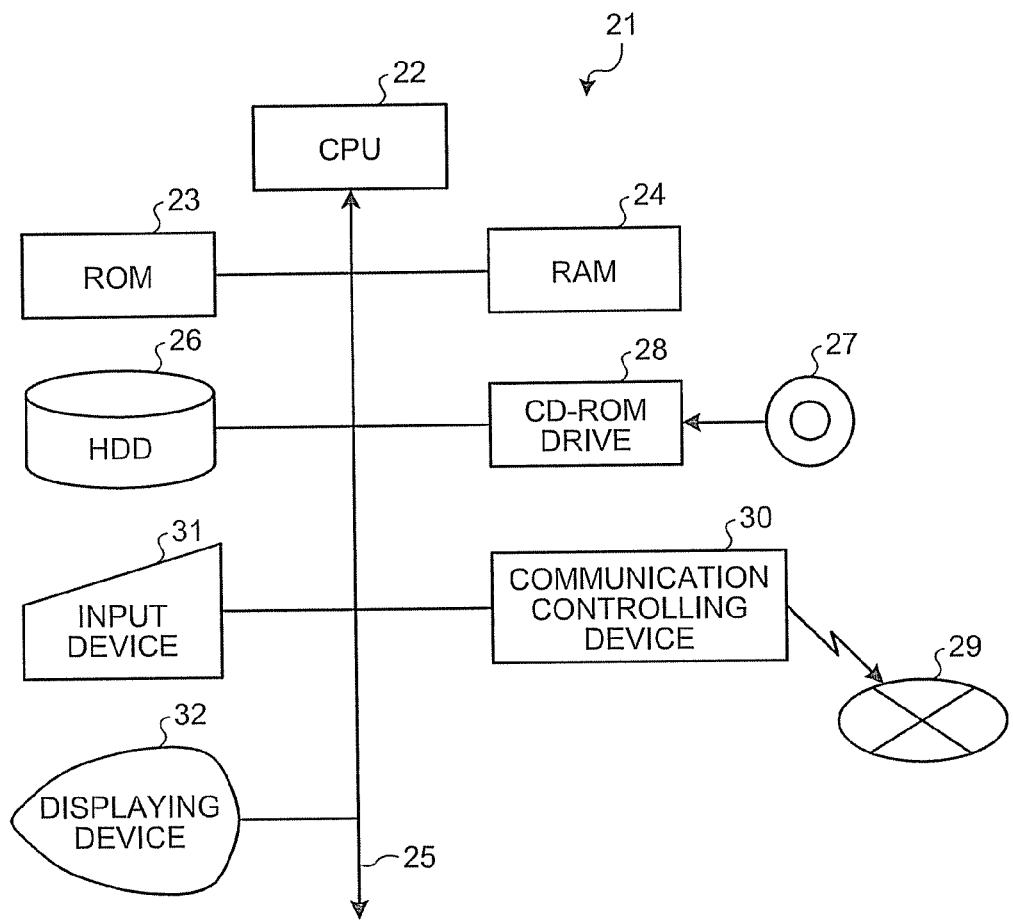
FIG. 1 is a diagram showing a hardware structure of a speech recognizing device 21 according to a first embodiment.

According to the present embodiments, a feature extraction apparatus incorporated in a speech recognition device is explained. Roughly speaking, the speech recognition device performs a speech recognition process for automatically recognizing human speeches by a computer. FIG. 1 is a diagram the hardware structure of the speech recognizing device 21. The speech recognizing device 21 may be a personal computer, including a central processing unit (CPU) 22, a read only memory (ROM) 23, a random access memory (RAM) 24, a hard disk drive (HDD) 26, a compact disc-ROM (CD-ROM) drive 28, a communication controlling device 30, an input device 31, a displaying device 32, and a bus 25 connecting these units to one another.

The CPU 22 is a principal unit of the computer that centrally controls other units. The ROM 23 is a read only memory that stores therein various programs such as a BIOS and various kinds of data. The RAM 24 is a memory that stores therein various kinds of data in a rewritable manner. The RAM 24 functions as a work area for the CPU 22 and plays a rule of a buffer. The communication controlling device 30 controls communications between the speech recognizing device 21 and a network 29. The input device 31 may be a keyboard and a mouse, and receives various operation instructions input by a user. The displaying device 32 may be a cathode ray tube (CRT) or a liquid crystal display (LCD), and displays various types of information.

The HDD 26 is a main storage device that stores therein various programs and various types of data. The CD-ROM drive 28 reads various types of data and programs stored in a CD-ROM 27. According to this embodiment, the CD-ROM 27 stores therein the operating system (OS) and various programs. The CPU 22 reads a program stored in the CD-ROM 27 by the CD-ROM drive 28, installs it on the HDD 26, executes the installed program, and realizes various functions.

Figure 2:
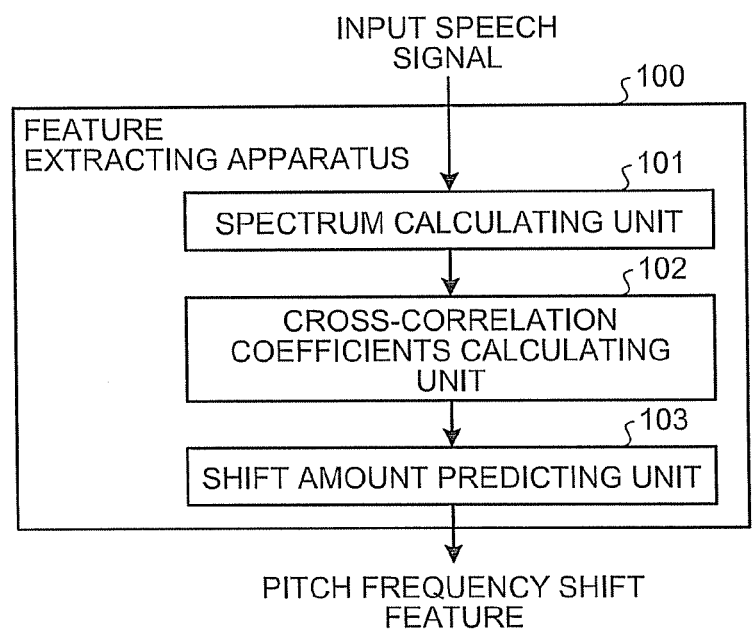
FIG. 2 is a block diagram showing a feature extraction function in detail according to the embodiment.

Among the functions realized on the speech recognizing device 21 when the CPU 22 executes various programs installed on the HDD 26, the function of extracting a feature according to the present embodiment is explained below. FIG. 2 is a block diagram showing the feature extraction function in detail. The feature extraction function means a function of obtaining a pitch frequency shift feature from a speech signal that is input. The pitch frequency shift feature is information that indicates how much the pitch frequency changes. This information is employed to obtain information regarding accents, intonation, and if the speech is voiced or unvoiced sounds. They are used as elements of prosodic information required for the speech recognition. The feature extraction apparatus 100 shown in FIG. 2 corresponds to the feature extraction function. This feature extraction apparatus 100 includes the spectrum calculating unit 101, the cross-correlation coefficients calculating unit 102, and the shift amount predicting unit 103.

The spectrum calculating unit 101 receives a speech signal that is divided in a predetermined length (25 microseconds, for example) at regular intervals (10 microseconds, for example). The predetermined length is referred to as a frame. The spectrum calculating unit 101 calculates for each frame of the input speech signal a frequency spectrum of frequency components obtained at regular intervals on the logarithmic frequency scale. The logarithmic frequency is obtained by converting the frequency (linear frequency) in a logarithm. The spectrum calculating unit 101 performs a Fourier transform and a wavelet transform based on the frequency points at regular intervals on the logarithmic frequency scale to calculate the frequency spectrum. Alternatively, the spectrum calculating unit 101 may calculate the frequency spectrum by performing a frequency scale transform on the linear frequency spectrum obtained by a Fourier transform based on the frequency points at regular intervals on the linear frequency scale.

The cross-correlation coefficients calculating unit 102 calculates, for each frame, a cross-correlation coefficients between the frequency spectra calculated by the spectrum calculating unit 101 for two frames that are positioned in the vicinity of the target frame and a predetermined numbers of frames apart from each other. The shift amount predicting unit 103 predicts the shift amount of the frequency spectra on the logarithmic frequency scale with respect to the width of the predetermined number of frames, and outputs this amount as a pitch frequency shift feature.

The procedure of the feature extraction process performed by the feature extraction apparatus 100 according to the present embodiment is explained below with reference to FIG. 3. When a target speech signal is input at step S100, the feature extraction apparatus 100 divides the speech signal into frames and inputs the frames of the speech signal to the spectrum calculating unit 101 to execute the following process for each frame. It is assumed here that the signal includes the number T of frames. Each of the target frames is numbered as t where $t(1 \leq t \leq T)$.

At step S200, the spectrum calculating unit 101 calculates, from the input speech signal, the time series of the frequency spectrum having the frequency components at regular intervals on the logarithmic frequency scale. The frequency spectrum for an arbitrary frame a is denoted as $S_a(w)$. The frequency points are numbered as $w (0 \leq w < W)$. $S_a(w)$ is obtained by a Fourier transform, a wavelet transform, a frequency scale transform, and the like, as mentioned above.

The range of frequency components should be defined, for example, as 100 to 2000 Hz, in the range of which vocal energy is relatively high. In this range, a spectrum that is less influenced by the background noise can be obtained.

At step S300, the cross-correlation coefficients calculating unit 102 calculates the cross-correlation coefficients based on the frequency spectra obtained at step S200. First, the calculation of the cross-correlation coefficients between the frequency spectra of any two frames is explained. For the frequency spectra $S_a(w)$ and $S_b(w)$ of frames a and b ($1 \leq a$, $b \leq T$), the cross-correlation coefficients $CS_{(a, b)}(n)$ is calculated by Equation 1. The value n is given from a set of certain integers between $-(W-1)$ and $W-1$.

$$CS_{(a,b)}(n) = \sum_w S_a(w) \cdot S_b(w \cdot n) \quad 0 \leq w < W \qquad (1)$$

To compensate the reduced number of frequency components used in the calculation of the cross-correlation coefficients in accordance with an increase in the absolute value of the shift amount, the right-hand side of the equation may be multiplied by a term $1/(W-|n|)$. Furthermore, the amplitude of the cross-correlation coefficients may be subjected to normalization.

Figure 4:
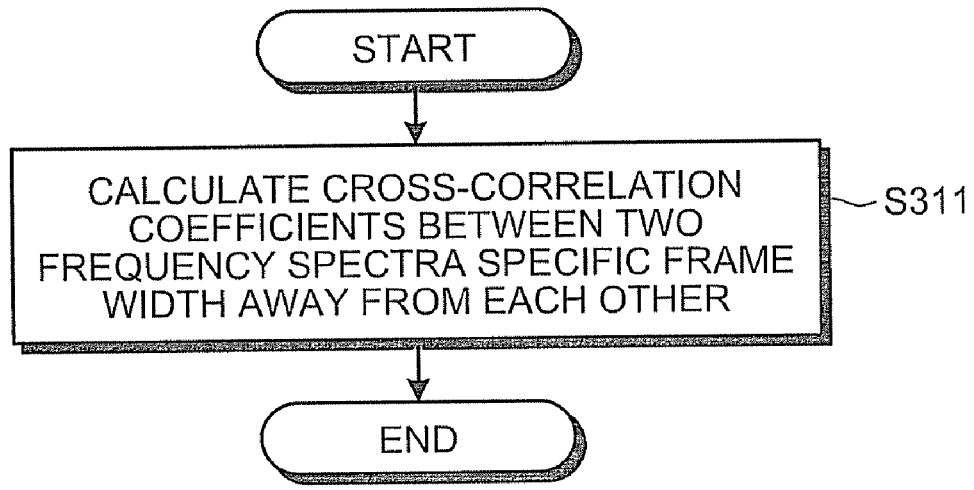
FIG. 4 is a flowchart showing the detailed procedure of an operation of calculating a cross-correlation coefficients executed by a cross-correlation coefficients calculating unit 102 at step S300 according to the embodiment.

The procedure of the process in which the cross-correlation coefficients calculating unit 102 calculates the cross-correlation coefficients at step S300 according to the present embodiment is explained in detail below with reference to FIG. 4. At step S311, the cross-correlation coefficients calculating unit 102 calculates the cross-correlation coefficients between the frequency spectra calculated for two frames that are positioned in the vicinity of the target frame and a predetermined number of frames apart from each other. In other words, the cross-correlation coefficients calculating unit 102 calculates the cross-correlation coefficients $CS_{(a, a-k)}(n)$ between the frequency spectrum $S_a(w)$ of the frame a positioned in the vicinity of the target frame t and the frequency spectrum $S_{a-k}(w)$ of a frame a-k positioned k frames away from the frame a ($k \geq 1$, $1 \leq a$, and $a-k \leq T$).

For example, when a=t and k=1, the cross-correlation coefficients between the frequency spectra of the target frame t and a frame t-1 positioned adjacent to the frame t can be obtained for each frame.

When a=t+1 and k=2, the cross-correlation coefficients between the frequency spectra of a frame t-1 positioned adjacent to the frame t and a frame t+1 also positioned adjacent to the frame t can be obtained for each frame.

It should be noted that the value for k is not specifically limited and that the value k may be varied for each frame.

Then, the cross-correlation coefficients calculating unit 102 outputs the obtained cross-correlation coefficients $CS_{(a, a-k)}(n)$ as a cross-correlation coefficients $C_t^{(k)}(n)$, where $C_t^{(k)}(n) = CS_{(a, a-k)}(n)$.

Figure 3:
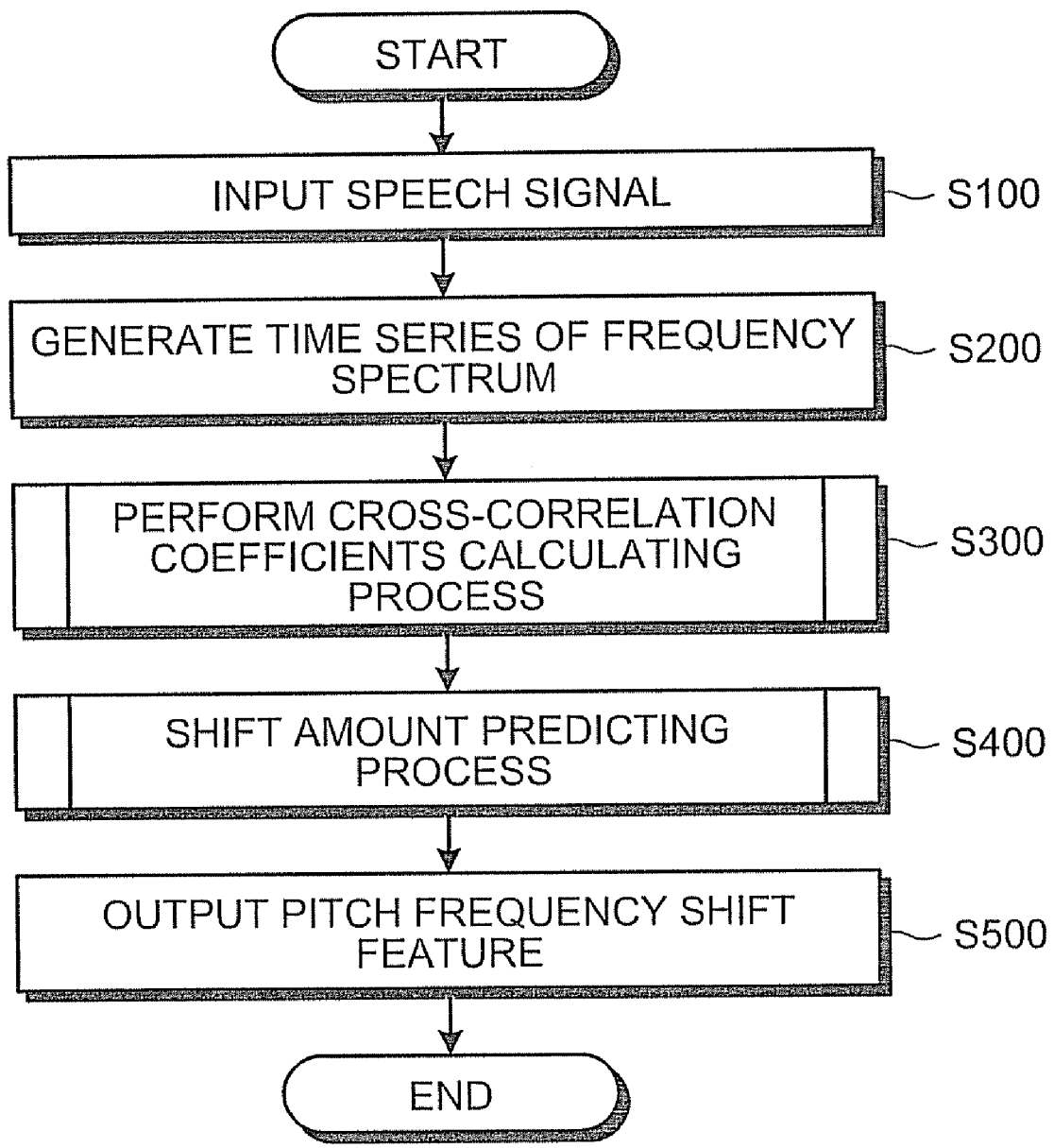
FIG. 3 is a flowchart showing the procedure of a feature extraction process executed by a feature extraction apparatus 100 according to the embodiment.
Figure 5:
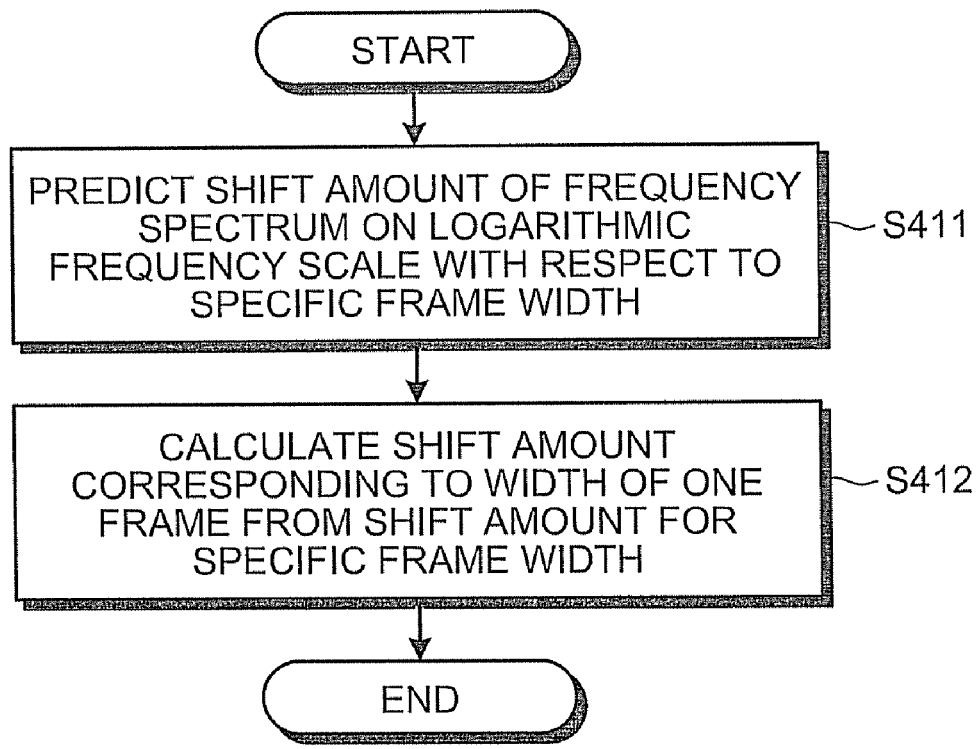
FIG. 5 is a flowchart showing the detailed procedure of an operation of predicting a shift amount executed by a shift amount predicting unit 103 according to the embodiment.

At step S400 in FIG. 3, the shift amount predicting unit 103 predicts the shift amount of the frequency spectra on the logarithmic frequency scale by use of the cross-correlation coefficients $C_t^{(k)}(n)$ output at step S300. FIG. 5 is a flowchart showing the detailed procedure of the operation of predicting the shift amount at step S400. The shift amount predicting unit 103 predicts the shift amount for the width of k frames at step S411. More specifically, the shift amount predicting unit 103 calculates the shift amount $d_t^{(k)}$ in accordance with Equation 2 by use of the cross-correlation coefficients $C_t^{(k)}(n)$ obtained at step S300, and thereby predicts the shift amount of the frequency spectra with respect to the width of k frames.

$$d_t^{(k)} = \operatorname*{argmax}_a C_t^{(k)}(n) \qquad (2)$$

The shift amount $d_t^{(k)}$ may be calculated in accordance with Equation 3. In this equation, θ is a threshold value predetermined with respect to the cross-correlation coefficient, and $E[\cdot]$ is an operation of calculating the average of the elements.

$$d_t^{(k)} E[n | C_t^{(k)}(n) > \theta)] \qquad (3)$$

The range for predicting the shift amount may be restricted. The calculation amount required for the prediction of the shift amount can be thereby reduced.

At step S412, the shift amount predicting unit 103 calculates a shift amount $d_t^{(1)}$ with respect to a width of one frame in accordance with Equation 4, based on the shift amount $d_t^{(k)}$ of the frequency spectra predicted at step S411 for the width of k frames.

$$d_t^{(1)} = \frac{d_t^{(3)}}{k} \qquad (4)$$

At step S500 in FIG. 3, the feature extraction apparatus 100 outputs the shift amount $d_t^{(1)}$ calculated for the width of one frame at step S400 as the pitch frequency shift feature. As a result, the pitch frequency shift feature that corresponds to the differential pitch frequency information can be obtained as one item of the pitch frequency shift information that indicates how much the pitch frequency changes.

Alternatively, at step S500, the feature extraction apparatus 100 may calculate a ratio $D_t$ of the change of the pitch frequency for the one-frame width in accordance with Equation 5 based on the shift amount $d_t^{(1)}$, and outputs this ratio as the pitch frequency shift feature. In this equation, $F_{max}$ denotes the maximum of the frequency (4000 Hz, for example) on the linear frequency scale, while $F_{min}$ denotes the minimum of the frequency (100 Hz, for example) on the linear frequency scale.

$$D_t = \exp\left(\frac{\log(F_{max}) - \log(F_{min})}{W} \cdot d_t^{(1)}\right) \qquad (5)$$

Figure 6:
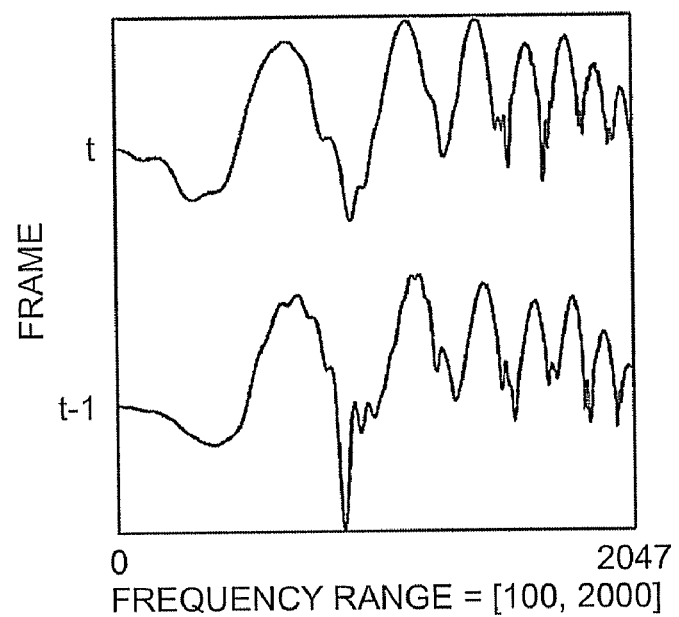
FIG. 6 is a graph showing exemplary frequency spectra calculated by a spectrum calculating unit 101 according to the embodiment, for two adjacent frames included in a voiced segment of a clean voice.
Figure 7:
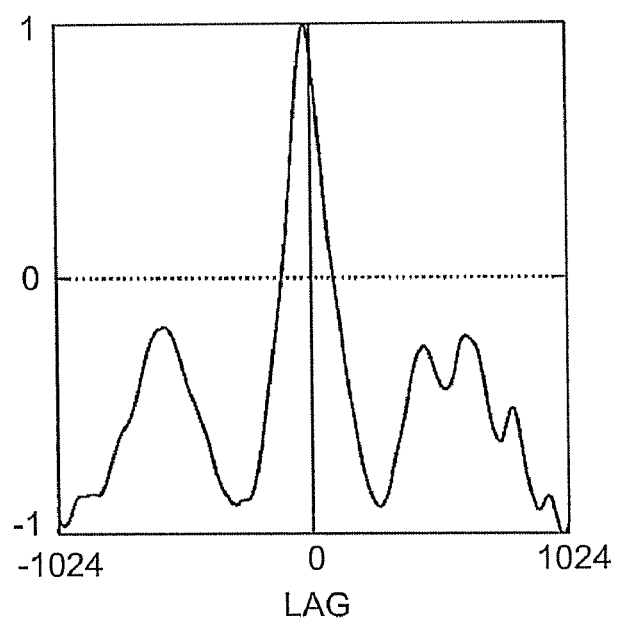
FIG. 7 is a graph showing an exemplary cross-correlation coefficients calculated by the cross-correlation coefficients calculating unit 102 according to the embodiment, between frequency spectra of frames t and t−1.
Figure 8:
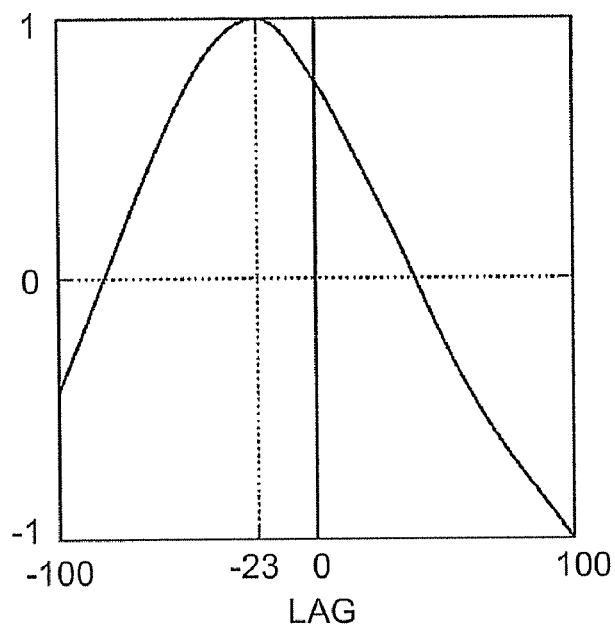
FIG. 8 is a graph showing the position of the shift amount at which the cross-correlation coefficient takes its peak value, by enlarging the range of the shift amount between −100 and 100 in FIG. 7. It should be noted that the horizontal axis of the graph of FIG. 6 indicates the shift amount in the frequency spectrum, and the vertical axis indicates the cross-correlation coefficient.

Examples of frequency spectra on the logarithmic frequency scale and the cross-correlation coefficients are discussed below with reference to FIGS. 6 to 9. FIG. 6 is a graph showing example frequency spectra calculated for two frames by the spectrum calculating unit 101. The two frames are adjacent to each other and included in a voiced segment of a clean speech. The horizontal axis of the graph in FIG. 6 indicates frequency point numbers, and the vertical axis indicates frame numbers. It is assumed here that $F_{min}$ is 100 Hz, $F_{max}$ is 2000 Hz, and W is 2048. FIG. 7 is a graph showing an example of the cross-correlation coefficients calculated by the cross-correlation coefficients calculating unit 102 for the frequency spectra of the frame t and the frame t-1. The horizontal axis of this graph indicates the shift amount of the frequency spectra, and the vertical axis indicates the cross-correlation coefficient. FIG. 8 is a graph showing the position of the shift amount where the cross-correlation coefficient reaches its peak in the enlarged view of FIG. 7 for the range of the shift amount between −100 and 100. The horizontal axis of the graph indicates the shift amount of the frequency spectrum, and the vertical axis indicates the cross-correlation coefficient. The vertical broken line shows the position of the shift amount at which the cross-correlation coefficient reaches its maximum value. According to this graph, the shift width is −23 when the cross-correlation coefficient reaches its maximum value.

Figure 9:
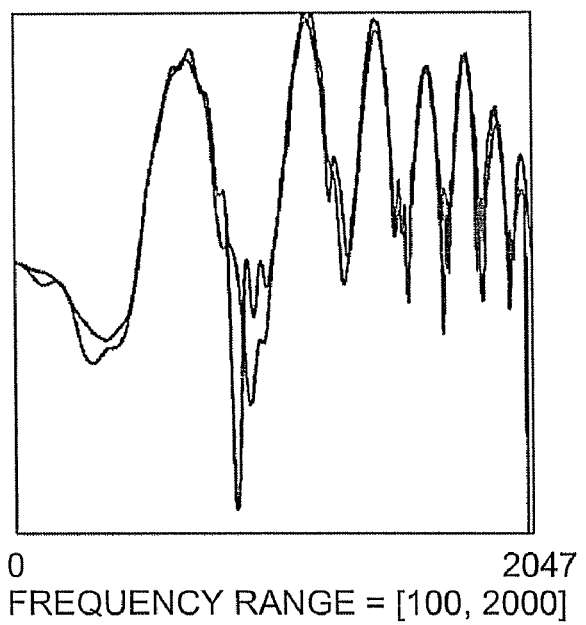
FIG. 9 is a graph showing a relationship between the shift amount in which the cross-correlation coefficient takes its peak value and the frequency spectrum adopted for the calculation of this cross-calculation coefficient.

FIG. 9 is a graph showing the relationship between the shift amount for which the cross-correlation coefficient reaches the maximum value and the frequency spectra that are used in the calculation of this cross-correlation coefficient. On this graph, the frequency point numbers of the frequency spectrum for the frame t−1 are slid in a direction for the shift amount for which the cross-correlation coefficient reaches the maximum value (i.e. the width of 23 to the left) so that the spectrum is displayed over the frequency spectrum for the frame t. The frequency spectrum for the frame t−1 drops to 0 at the right end because a blank is created by shifting the frame. As can be seen from FIG. 9, after the frequency point numbers of the frequency spectrum for the frame t−1 are shifted 23 to the left on the graph, the positions of the peaks (harmonic components) of the frequency spectra for the frames t and t−1 on the logarithmic frequency scale substantially coincide with each other.

By calculating the frequency spectrum having frequency components at regular intervals on the logarithmic frequency scale, the shift amount is the same for any peak (harmonic component) of the frequency spectrum that shifts in accordance with the pitch frequency, and thus this shift amount corresponds to the one that has a higher correlation coefficient on the cross-correlation coefficients. By predicting the shift amount corresponding to the differential pitch frequency from the cross-correlation coefficients, the differential pitch frequency information can be obtained as pitch frequency shift information, without restricting the ranges of the pitch prediction and the pitch frequency. The influence of the background noise to the resultant information is significantly reduced.

A feature extraction apparatus according to a second embodiment is now described. The same units as those of the first embodiment are given the same reference numerals, and the explanation thereof is omitted.

The feature extraction apparatus 100 according to the second embodiment differs from the feature extraction apparatus 100 according to the first embodiment in the following respect. The cross-correlation coefficients calculating unit 102 of the feature extraction apparatus 100 according to the second embodiment calculates, for each of two different frames or more in the vicinity of the target frame, a cross-correlation coefficients between the frequency spectra calculated by the spectrum calculating unit 101 for the frames in the vicinity that include a frame in the vicinity of the target frame and a frame that is predetermined number of frames away from this frame. Then, the cross-correlation coefficients calculating unit 102 integrates the calculated cross-correlation coefficients into one cross-correlation coefficients.

The procedure of the feature extraction process executed by the feature extraction apparatus 100 according to the present embodiment is explained below. The overall feature extraction process is the same as the process illustrated in FIG. 3. The procedure of the process according to the second embodiment is different from the counterpart of the first embodiment in the operation at step S300 where the cross-correlation coefficients calculating unit 102 calculates the cross-correlation coefficients. FIG. 10 is a flowchart of the detailed procedure of the operation in which the cross-correlation coefficients calculating unit 102 calculates the cross-correlation coefficients. At step S321, the cross-correlation coefficients calculating unit 102 calculates, for each of two frames or more in the vicinity of the target frame, calculates the cross-correlation coefficients between the frequency spectra calculated at step S200 for one of the vicinity frames and a frame that is a predetermined number of frames away from the vicinity frame. In other words, the cross-correlation coefficients calculating unit 102 calculates, for each of the number I of frames u(i) ($1 \leq i \leq I$ and $I \geq 2$) that are in the vicinity of the target frame t, a cross-correlation coefficients $CS_{(u(i), u(i)-k)}(n)$ between a spectrum $S_{u(i)}(w)$ of the frame u(i) and a spectrum $S_{u(i)-k}(w)$ of a frame u(i)−k that is k frames away from the frame u(i) ($k \geq 1$, $1 \leq u(i)$, and $u(i)-k \leq T$).

For example, when u(1)=t−1, u(2)=t, u(3)=t+1, and k=1, a cross-correlation coefficients between the frequency spectra of adjacent frames is obtained for each of three frames in the vicinity of the frame t.

At step S322, the cross-correlation coefficients calculating unit 102 integrates the multiple cross-correlation coefficients calculated at step S321 into a cross-correlation coefficients $C_t^{(k)}(n)$ and outputs the resultant cross-correlation coefficients. More specifically, the cross-correlation coefficients calculating unit 102 integrates the cross-correlation coefficients in accordance with Equation 6.

$$C_t^{(s)}(n) = \sum_u CS_{(u,u-k)}(n) \tag{6}$$

At step S322, the integration of the cross-correlation coefficients by the cross-correlation coefficients calculating unit 102 may be conducted in accordance with Equation 7.

$$C_t^{(k)}(n) = \prod_u CS_{(u,u-k)}(n) \tag{7}$$

Alternatively, the integration of the cross-correlation coefficients by the cross-correlation coefficients calculating unit 102 may be conducted in accordance with Equation 8.

$$C_t^{(k)}(n) = \max_a CS_{(u,u-k)}(n) \tag{8}$$

Each of the cross-correlations is calculated from the frequency spectra calculated for one of the multiple frames in the vicinity of the target frame and a frame that is a predetermined number of frames away from the vicinity frame, and a cross-correlation coefficients is calculated for each of the frames in the vicinity of the target frame. Then, the cross-correlation coefficients are integrated into one cross-correlation coefficients. The pitch frequency shift information can be thereby obtained in a more stable manner than when calculating only one cross-correlation coefficients.

Next, the feature extraction apparatus according to a third embodiment is explained. The same components as in the first or second embodiment are given the same reference numerals, and the explanation thereof is omitted.

The feature extraction apparatus 100 according to the third embodiment is different from the feature extraction apparatus

100 according to the first embodiment in the following respect. The cross-correlation coefficients calculating unit 102 of the feature extraction apparatus 100 generates the time series of a frequency spectrum segment obtained by connecting two frequency spectra or more that are consecutive in the time direction, based on the time series of the frequency spectra calculated by the spectrum calculating unit 101. The cross-correlation coefficients calculating unit 102 further calculates, for each frame, a cross-correlation coefficients between the frequency spectrum segments generated individually for two frames in the vicinity of the target frame and a predetermined number of frames apart from each other.

The procedure of the feature extraction process performed by the feature extraction apparatus 100 according to the present embodiment is explained below. The overall procedure of the feature extraction process is the same as that of FIG. 3. The present embodiment differs from the first embodiment in the operation at step S300 where the cross-correlation coefficients calculating unit 102 calculates the cross-correlation coefficients. FIG. 11 is a flowchart showing the operation in detail, in which the cross-correlation coefficients calculating unit 102 calculates the cross-correlation coefficients at step S300. At step S331, the cross-correlation coefficients calculating unit 102 uses the time series of the frequency spectra calculated at step S200 and thereby generates the time series of a frequency spectrum segment obtained by connecting two frequency spectra or more that are consecutive in the time direction. More specifically, when the frequency spectrum of the target frame t is $S_t=(S_t(0), S_t(1), \ldots, S_t(W-1))$, the cross-correlation coefficients calculating unit 102 generates a frequency spectrum segment $Seg_t$ in accordance with Equation 9, by connecting the spectra $S_{u(i)}$ ($1 \leq i \leq I$ and $I \geq 2$) for the number J of frames $v(i)$ that are consecutive in the time direction.

$$Seg_t = (S_{u(1)}, S_{u(2)}, \ldots, S_{u(I)}) = (S_{u(2)}(0), S_{u(1)}(1), \ldots, S_{u(2)}(W-1), \ldots, S_{u(1)}(0), S_{u(2)}(1), \ldots, S_{u(1)}(W-1)) \quad (9)$$

For example, when $v(1)=t-1$, $v(2)=t$, $v(3)=t+1$, and $J=3$, a frequency spectrum segment is generated for each frame by connecting three frames that are in the vicinity of the frame t.

At step S332, the cross-correlation coefficients calculating unit 102 calculates the cross-correlation coefficients between the frequency spectrum segments generated individually for two frames that are in the vicinity of the target frame t and a predetermined number of frames away from each other. More specifically, the cross-correlation coefficients calculating unit 102 calculates, in accordance with Equation 10, a cross-correlation coefficients $C_t^{(k)}(n)$ between a frequency spectrum segment $Seg_a(o)$ ($0 \leq o < J \cdot W$) of the frame a in the vicinity of the frame t and a frequency spectrum segment $Seg_{a-k}(p)$ of the frame a-k that is k frames away from the frame a ($k \geq 1$, $1 \leq a$, and $a-k \leq T$), and outputs the cross-correlation coefficients. The value o is given from among a set of certain integers included between $-(J \cdot W-1)$ and $J \cdot W-1$.

$$C_t^{(k)}(n) = \sum_m Seg_u(w) \cdot Seg_{u-k}(w-n) \quad 0 \leq w < J \cdot W \quad (10)$$

The time series of the frequency spectrum segments are generated by connecting two frequent spectra or more consecutive in the time direction, and the cross-correlation coefficients between two frequency spectrum segments that are positioned in the vicinity of the target frame is calculated for each target frame. In this manner, the pitch frequency shift information can be obtained more reliably than when calculating the cross-correlation coefficients between the frequency spectra for individual frames.

The feature extraction apparatus according to a fourth embodiment is now explained. The same units as those of the first to third embodiments are given the same reference numerals, and the explanation thereof is omitted.

The feature extraction apparatus 100 according to the fourth embodiment differs from the feature extraction apparatus 100 according to the first embodiment in the following respect. The cross-correlation coefficients calculating unit 102 of the feature extraction apparatus 100 calculates, by using the time series of the frequency spectra calculated by the spectrum calculating unit 101, the time series of the correlation coefficients for each frame with the target frame serving as a reference frame. Then, the cross-correlation coefficients calculating unit 102 recursively updates the time series of the correlation coefficients. When the condition for the termination of the recursive process is met, the cross-correlation coefficients calculating unit 102 calculates the cross-correlation coefficients for the target frame by use of the recursively calculated time series of the correlation coefficients.

Figure 12:
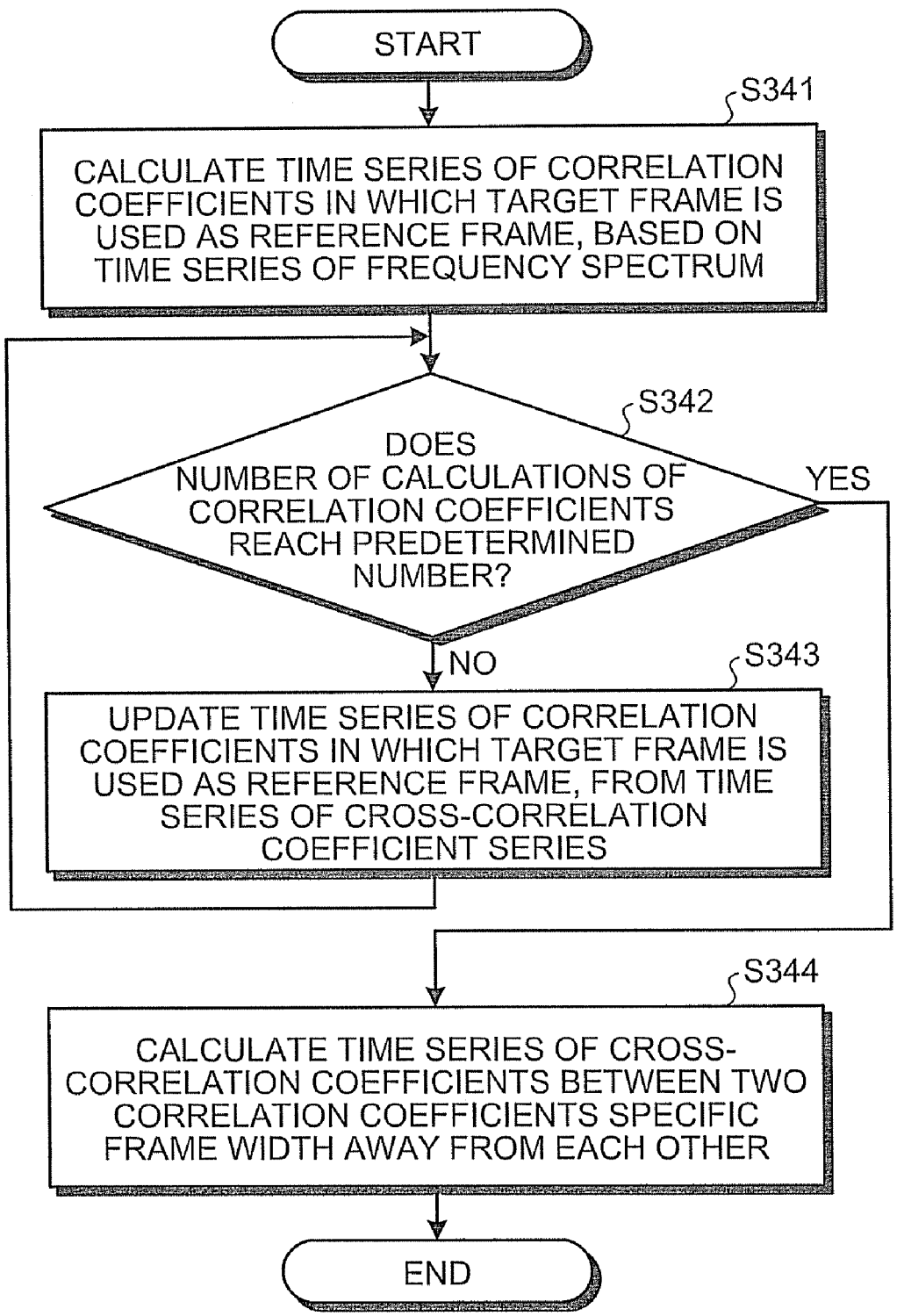
FIG. 12 is a flowchart showing the detailed procedure of an operation in which the cross-correlation coefficients calculating unit 102 calculates the cross-correlation coefficients according to a fourth embodiment.

The procedure of the feature extraction process conducted by the feature extraction apparatus 100 according to the present embodiment is explained below. The overall procedure of this feature extraction process is the same as the process indicated in FIG. 3. According to the fourth embodiment, the procedure of the operation in which the cross-correlation coefficients calculating unit 102 calculates the cross-correlation coefficients at step S300 is different from the counterpart of the first embodiment. FIG. 12 is a flowchart showing the procedure of the operation at step S300, where the cross-correlation coefficients calculating unit 102 calculates the cross-correlation coefficients. At step S341, the cross-correlation coefficients calculating unit 102 calculates the time series of the correlation coefficients with the target frame serving as a reference frame, by use of the time series of the frequency spectra calculated at step S200. More specifically, the cross-correlation coefficients calculating unit 102 calculates the time series $CS_{(y, t)}(n)$ ($1 \leq y < T$) of the correlation coefficients by use of the time series of the frequency spectra, with the frame t serving as a reference frame, and outputs the time series as $CS^{\{0\}}_{(y, t)}(n)$. It should be noted that $CS^{\{0\}}_{(y, t)}(n) = CS_{(y, t)}(n)$.

At step S342, the cross-correlation coefficients calculating unit 102 determines whether the condition of terminating the recursive process is met. The condition of terminating the recursive process means whether the recursive calculations of the correlation coefficients reach a predetermined number of times. In other words, the cross-correlation coefficients calculating unit 102 counts updates of the correlation coefficients conducted at step S343, and determines whether the count x reaches the target count X. When x reaches X (yes at step S342), the system proceeds to step S344. If x has not reached X (no at step S342), the system proceeds to step S343.

At step S343, the cross-correlation coefficients calculating unit 102 updates the time series of the correlation coefficients in which the target frame serves as a reference frame, based on the time series of the cross-correlation coefficients. That is, the cross-correlation coefficients calculating unit 102 recursively updates the time series $CS^{\{x\}}_{(y, t)}(n)$ of the correlation coefficients calculated by using the target frame t as a reference frame, from the time series $CS^{\{x-1\}}_{(y, t)}(n)$ of the cross-correlation coefficients in accordance with Equation 11.

$$CS^{(s)}_{(yn)}(n) = \sum_m CS^{(x-l)}_{(y,t)}(m) \cdot CS^{(x-l)}_{(t,t)}(m+n) \quad 0 \leq m < W \quad (11)$$

In the similar manner to Equation 1, a term 1/(W−|n|) may be added to the right hand side of Equation 11 to compensate the reduction in the number of frequency components used in the calculation of the cross-correlation coefficient in accordance with an increase in the absolute value of the shift amount. In addition, the amplitude of the cross-correlation coefficients may be subjected to normalization.

At step S344, the cross-correlation coefficients calculating unit 102 calculates the cross-correlation coefficients between the time series of the correlation coefficients calculated individually for two frames that are in the vicinity of the target frame t (reference frame) and a predetermined number of frames away from each other, as the cross-correlation coefficients of the frame t. In other words, the cross-correlation coefficients calculating unit 102 calculates the cross-correlation coefficients $C_t^{(k)}(n)$ between the correlation coefficients $CS^{\{x\}}(a, t)(n)$ of the frame a that is positioned in the vicinity of the target frame t and the correlation coefficients $CS^{\{x\}}(a−k, t)(n)$ of the frame a−k ($k \geq 1$, $1 \leq a$, and $a−k \leq T$) that is k frames away from the frame a in accordance with Equation 12, based on the time series $CS^{\{x\}}(v, t)(n)$ of the correlation coefficients calculated by using the target frame t as a reference frame, and outputs this cross-correlation coefficients.

$$C_1^{(k)}(n) = \sum_m CS_{(u,t)}^{(x)}(m) \cdot CS_{(a-k,t)}^{(x)}(m+n) \quad 0 \leq m < W \tag{12}$$

By recursively obtaining the correlation coefficients, the shift amount of the spectrum peak (harmonic component) that corresponds to the variance of the pitch frequency appears at the position of a very sharp peak on the correlation coefficients. Hence, the obtained pitch frequency shift information is robust against noise.

The feature extraction apparatus according to a fifth embodiment is explained next. The same units as those of the first to fourth embodiments are given the same reference numerals, and the explanation thereof is omitted.

The feature extraction apparatus 100 according to the fifth embodiment is different from the feature extraction apparatus 100 according to the first embodiment in the following respect. The cross-correlation coefficients calculating unit 102 of the feature extraction apparatus 100 calculates, for each frame, the cross-correlation coefficients between the frequency spectra individually calculated individually for two frames that are in the vicinity of the target frame and a predetermined number of frames apart from each other by the spectrum calculating unit 101, by adopting different frame widths that are predetermined. The shift amount predicting unit 103 predicts two shift amounts or more that correspond to the two cross-correlation coefficients or more calculated by the cross-correlation coefficients calculating unit 102, and integrates these shift amounts into one shift amount.

The procedure of the feature extraction process conducted by the feature extraction apparatus 100 according to the present embodiment is explained below. The overall procedure of the feature extraction process is the same as the process illustrated in FIG. 3. The procedure according to the present embodiment differs from the counterpart of FIG. 3 in the operations of the cross-correlation coefficients calculating unit 102 calculating the cross-correlation coefficients at step S300 and the shift amount predicting unit 103 predicting the shift amounts at step S400.

Figure 13:
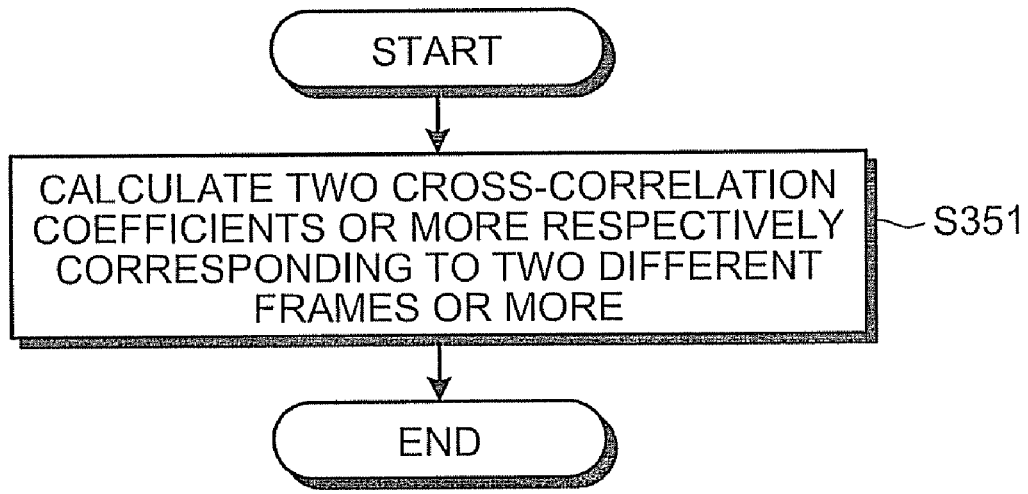
FIG. 13 is a flowchart showing the detailed procedure of an operation in which the cross-correlation coefficients calculating unit 102 calculates the cross-correlation coefficients according to a fifth embodiment.

The process at step S300 is explained first. FIG. 13 is a flowchart of the operation in which the cross-correlation coefficients calculating unit 102 calculates the cross-correlation coefficients at step S300. At step S351, the cross-correlation coefficients calculating unit 102 calculates, for each frame by adopting different frame widths that are predetermined, the cross-correlation coefficients between the frequency spectra calculated at step S200 individually for two frames that are in the vicinity of the target frame and a predetermined number of frames away from each other. In other words, when the number K of frame widths are expressed as k(i) ($2 \leq i < I$ and $I \geq 2$), the cross-correlation coefficients calculating unit 102 calculates, for each of two or more widths k(i), the cross-correlation coefficients $CS_{(a(i), a(i)-k(i))}(n)$ between the spectrum $S_{a(i)}(w)$ of the frame a(i) ($1 \leq a(i) \leq T$) that is in the vicinity of the frame t and the spectrum $S_{a(i)-k(i)}(w)$ of the frame a(i)−k(i) that is k(i) frames away from the frame a(i), and output this cross-correlation coefficients as $C_t^{(k(i))}(n)$. It should be noted that $C_t^{(k(i))}(n) = CS_{(a(i), a(i)-k(i))}(n)$.

For example, when k(1)=2, k(2)=4, a(1)=t+1, and a(2)=t+2, the cross-correlation coefficients calculating unit 102 outputs, for each frame, the cross-correlation coefficients $C_t^{(2)}(n)$ between the frequency spectra for the frames that are two frames away from each other with reference to the target frame and the cross-correlation coefficients $C_t^{(4)}(n)$ between the frequency spectra for the frames that are four frames away from each other with reference to the target frame.

Figure 14:
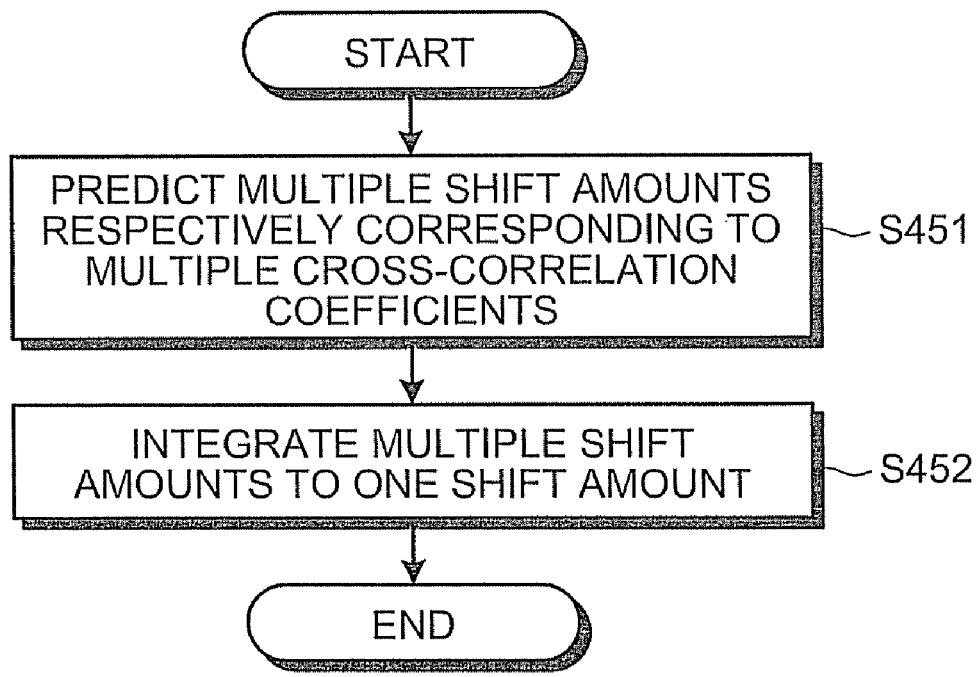
FIG. 14 is a flowchart showing the detailed procedure of an operation in which the shift amount predicting unit 103 predicts the shift amount according to the fifth embodiment.

First, the procedure of the operation at step S400 is explained. FIG. 14 is a flowchart of the operation in which the shift amount predicting unit 103 predicts the shift amounts at step S400. At step S451, the shift amount predicting unit 103 predicts multiple shift amounts that each correspond to the multiple cross-correlation coefficients. In other words, the shift amount predicting unit 103 predicts a shift amount $d_t^{(k(i))}$ that corresponds to each of the cross-correlation coefficients $C_t^{(k(i))}(n)$ calculated at step S351.

For example, when k(1)=2 and k(2)=4, a 2-frame-width shift amount $d_t^{(2)}$ and a 4-frame-width shift amount $d_t^{(4)}$ are predicted.

At step S452, the shift amount predicting unit 103 integrates the multiple shift amounts into one shift amount. More specifically, the shift amount predicting unit 103 integrates the shift amounts $d_t^{(k(i))}$ predicted at step S451 into the shift amount $d_t^{(1)}$ in accordance with Equation 13.

$$d_t^{(1)} = \sum_i \left( \frac{d_1^{(k(l))}}{k(i)} \right) \tag{13}$$

The shift amount predicting unit 103 may integrate the shift amounts in accordance with Equation 14 at step S452.

$$d_t^{(1)} = \frac{\sum_i 1(i) \cdot d_t^{(1(i))}}{2 \sum_j 1(i)^2} \tag{14}$$

It is assumed here that l(i)=k(i)/2 (k(i) is always an even number).

According to the present embodiment, two cross-correlation coefficients or more that correspond to two frame widths or more are calculated for each frame, and two shift amounts or more that correspond to these cross-correlation coefficients are predicted and integrated into one shift amount. For this reason, even when there is a frame from which frequency components cannot be attained with high accuracy, the influence of such a frame can be reduced. Thus, the pitch frequency shift information can be obtained in a reliable manner.

The frequency spectra calculated at step S200 according to the above embodiments may be frequency spectra of which the amplitude is normalized. More specifically, the normalization of the amplitude can be performed in any one of methods of determining the average of the amplitudes of the frequency spectra as a certain value (0, for example), determining the variance as a certain value (1, for example), determining the minimum and the maximum as certain values (0 and 1, for example), and determining the variance of the amplitude of the speech waveform for which frequency spectra are sought as a certain value (1, for example).

The frequency spectra calculated at step S200 may be spectra of residual components after removing a spectral envelop component. The residual component spectra may be calculated from a residual signal obtained by linear prediction analysis or the like, or calculated by Fourier transform from the higher-order components of a cepstrum. Furthermore, the amplitude normalization may be performed on the spectra of the residual components.

The frequency spectra calculated at step S200 may be the cepstrum. In addition, the amplitude normalization may be performed on the cepstrum.

The frequency spectra calculated at step S200 may be an autocorrelation coefficients. Furthermore, the amplitude normalization may be performed on the autocorrelation coefficients.

According to the above embodiments, the CD-ROM 27 is adopted for a computer readable medium that stores therein various programs and various types of data. However, various optical disks such as a DVD, various magneto-optical disks, magnetic disks such as a flexible disk, a semiconductor memory, and any other media can be adopted. In addition, programs can be downloaded by way of the communication controlling device 30 from the network 29 such as the Internet, and installed in the HDD 26. The storage device that stores therein programs in the transmitting server is also considered as a computer readable medium. The program implemented on the speech recognizing device 21 may be a program that runs on the operating system (OS). Part of the operations may be offloaded on the OS, or may be included as part of program files that constitute a certain application or the OS.

In the examples according to the above embodiments, the application of the feature extraction apparatus to a speech recognition device is discussed. The application is not limited thereto, however. The feature extraction apparatus having the above functions may be applied to a speech segment detecting device, a pitch estimation device, and a speaker recognizing device that require the pitch frequency shift information.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A feature extraction apparatus comprising:
   a spectrum calculating unit configured to calculate, based on an input speech signal, a frequency spectrum having frequency components obtained at regular intervals on a logarithmic frequency scale for each of frames that are defined by regular time intervals, and thereby generates a time series of the frequency spectrum;
   a cross-correlation coefficients calculating unit configured to calculate, for each target frame of the frames, a cross-correlation coefficients between frequency spectra calculated for two different frames that are in vicinity of the target frame and a predetermined frame width apart from each other; and
   a shift amount predicting unit configured to predict a shift amount of the frequency spectra on the logarithmic frequency scale with respect to the predetermined frame width by use of the cross-correlation coefficients.

2. The apparatus according to claim 1, wherein the cross-correlation coefficients calculating unit calculates, for each of the frames, the cross-correlation coefficients between the frequency spectra calculated for two different frames or more including a vicinity frame that is in the vicinity of the target frame and a frame that is the predetermined frame width away from the vicinity frame, and integrates the calculated two cross-correlation coefficients or more into one cross-correlation coefficients.

3. The apparatus according to claim 1, wherein the cross-correlation coefficients calculating unit generates a time series of a frequency spectrum segment in which the two frequency spectra or more that are consecutive in a time direction are connected by use of the time series of the frequency spectra, and calculates, for each target frame of the frames, the cross-correlation coefficients between frequency spectrum segments generated for the two frames that are in the vicinity of the target frame and the predetermined frame width apart from each other.

4. The apparatus according to claim 1, wherein the cross-correlation coefficients calculating unit calculates, for each of the frames, a time series of a correlation coefficients with the target frame serving as a reference frame by use of the time series of the frequency spectrum, recursively updates the time series of the correlation coefficients, and calculates a cross-correlation coefficients of the reference frame by use of the time series of the correlation coefficients that is recursively updated, when a condition of terminating an operation of recursively updating the time series of the correlation coefficients is met.

5. The apparatus according to claim 4, wherein the cross-correlation coefficients calculating unit calculates the cross-correlation coefficients between the time series of the correlation coefficients calculated individually for the two frames that are in the vicinity of the reference frame and the predetermined frame width apart from each other, as the cross-correlation coefficients of the reference frame, when the condition of terminating is met.

6. The apparatus according to claim 1, wherein
   the cross-correlation coefficients calculating unit calculates, for each of the frames by using different frame widths, the cross-correlation coefficients between the frequency spectra calculated for the two frames that are in the vicinity of the target frame and one of the different frame widths away from each other; and
   the shift amount predicting unit predicts shift amounts that correspond to the cross-correlation coefficients calculated by use of the different frame widths, and integrates the predicted two shift amounts or more into one shift amount.

7. The apparatus according to claim 1, wherein the spectrum calculating unit generates the time series of the frequency spectrum by calculating a frequency spectrum of residual components that remain after spectral envelop components are removed.

8. The apparatus according to claim 1, wherein the spectrum calculating unit includes a normalizing unit that normalizes amplitude of the frequency spectrum.

9. The apparatus according to claim 1, wherein
the predetermined frame width is variable for each frame; and
the cross-correlation coefficients calculating unit calculates, for each of the frames, the cross-correlation coefficients between the frequency spectra calculated for the two frames that are in the vicinity of the target frame and apart from each other for a predetermined frame width corresponding to the target frame.

10. A feature extraction method executed in an feature extraction apparatus including a spectrum calculating unit, a cross-correlation coefficients calculating unit and a shift amount predicting unit, the method comprising:
calculating, based on an input speech signal by the a spectrum calculating unit, a frequency spectrum having frequency components obtained at regular intervals on a logarithmic frequency scale for each of frames that are defined by regular time intervals, and thereby generating a time series of the frequency spectrum;
calculating, for each target frame of the frames by the a cross-correlation coefficients calculating unit, a cross-correlation coefficients between frequency spectra calculated for two different frames that are in vicinity of the target frame and a predetermined frame width apart from each other; and
predicting a shift amount of the frequency spectra on the logarithmic frequency scale by the shift amount predicting unit with respect to the predetermined frame width by use of the cross-correlation coefficients.

11. A computer program product having a computer readable medium including programmed instructions, when executed by a computer that is provided in a feature extraction apparatus including a spectrum calculating unit, a cross-correlation coefficients calculating unit and a shift amount predicting unit, wherein the instructions cause the computer to perform:
calculating, based on an input speech signal by the a spectrum calculating unit, a frequency spectrum having frequency components obtained at regular intervals on a logarithmic frequency scale for each of frames that are defined by regular time intervals, and thereby generating a time series of the frequency spectrum;
calculating, for each target frame of the frames by the a cross-correlation coefficients calculating unit, a cross-correlation coefficients between frequency spectra calculated for two different frames that are in vicinity of the target frame and a predetermined frame width apart from each other; and
predicting a shift amount of the frequency spectra on the logarithmic frequency scale by the shift amount predicting unit with respect to the predetermined frame width by use of the cross-correlation coefficients.

* * * * *